Patented Sept. 22, 1953

2,653,165

UNITED STATES PATENT OFFICE 2,653,165

OXIDATION PROCESS

Irving E. Levine, Albany, Calif., assignor to California Research Corporation, San Francisco, Calif., a corporation of Delaware No Drawing. Application September 27, 1950,
Serial No. 187,127

18 Claims. (Cl. 260—475)

This invention relates to a process for producing valuable derivatives of phthalic acids, more particularly it relates to a process for producing such derivatives by oxidizing esters of toluic acids and low molecular weight alcohols.

The production of phthalic acids and phthalic acid derivatives by the methods available in the prior art has been generally characterized by low product yields and complex problems of product separation. Phthalic acids have been produced by oxidation of dialkyl benzenes, such as the xylenes, and by oxidation of toluic acids by contacting the dialkyl benzene or toluic acid in liquid phase with an oxygen-containing gas. Product yields obtained by these methods are very much lower than the yields which are theoretically obtainable. The production of monoesters of phthalic acids by the methods available in the prior art has involved the separation of the monoesters from complex reaction mixtures comprising di-esters, monoesters, unreacted acid, and unreacted alcohol. The production of mixed di-esters of phthalic acids in the past has involved the separation of a still more complex reaction product mixture comprising the di-ester of phthalic acid with each of two alcohols, the mixed di-ester of phthalic acid, and two unreacted alcohols.

It is an object of this invention to provide a method for converting dialkyl benzenes, such as xylenes, and/or alkyl benzoic acids, such as toluic acids, to phthalic acids at higher yields than have heretofore been obtainable in processes in which these materials were oxidized in liquid phase by contact with an oxygen-containing gas.

It is a further object of this invention to provide a method for the production of monoesters of phthalic acids in substantially pure form without the necessity of separating complex reaction mixtures to obtain the desired monoester.

It is a further object of this invention to provide a method for producing mixed di-esters of phthalic acids without the necessity of separating complex reaction mixtures in order to obtain the desired product in relatively pure form.

I have found that the esters of toluic acids with low molecular weight alcohols, especially alcohols containing 1 to 4 carbon atoms per molecule, may be oxidized in liquid phase by contact with an oxygen-containing gas to produce the corresponding monoester of a phthalic acid. The oxidation is conducted in the presence or absence of an oxidation catalyst at moderately elevated temperatures in the range about 300 to 500° F. The oxidation reaction proceeds smoothly with little attack on the ester group to produce a reaction product comprising a monoester of phthalic acid and unreacted toluic acid. The monoester of phthalic acid may be taken as the reaction product, it may be converted to the acid itself by hydrolyzing the ester group, or it may be converted to a di-ester of phthalic acid by esterifying the free acid group of the monoester with an alcohol. The production of these phthalic acid derivatives is described in detail hereinafter.

In the practice of my invention I may employ a monoester of toluic acid as a starting material or I may employ a xylene, a mixture of xylenes, a toluic acid or a mixture of toluic acids as the starting material. When xylenes are employed as the starting material they are oxidized to toluic acids, the toluic acids are esterified with a low molecular weight alcohol, and the toluic acid ester is oxidized to a monoester of phthalic acid. The monoester product may then be worked up to recover either the monoester of phthalic acid, the phthalic acid itself, or a di-ester of phthalic acid as the ultimate product. When a xylene material is employed as the starting material, it may be either a mixture of xylene isomers, such as the mixtures produced in the coking of coal, or the mixtures produced by hydroforming a naphthenic petroleum stock. It may also be a pure xylene isomer.

The production of toluic acid from a xylene stock is illustrated by the following experiment: A xylene cut separated from catalytically reformed naphtha was employed as a charging stock. It contained approximately 73% of mixed xylenes, 15% ethylbenzene, and the balance non-aromatics (paraffins and naphthenes) boiling in the boiling range of xylenes. This feed was charged to a tank-type oxidizer together with a small amount of cobalt naphthenate catalyst. This mixture was blown with air to produce toluic acids, oxy acids, acetophenone, carbon dioxide, and other products of oxidation. Some phthalic acid was produced. Mixed toluic acids were separated from the reaction product mixture by fractional distillation.

In another experiment a feed stock containing 95% metaxylene and small amounts of the other xylene isomers, ethylbenzene and paraffins, was blown with air at at temperature of 300 to 310° F. for a period of four hours. The metaxylene feed contained 0.013% by weight of added cobalt in the form of cobalt naphthenate. A pressure of 50 p. s. i. g. was maintained in the reactor. 81.7% of the metaxylene was oxidized to produce a reaction product containing 69.8 mol per cent of metatoluic acid. The hot reaction product mixture was filtered to separate phthalic acids as the filter cake and metatoluic acid was recovered in substantially pure form by fractionally distilling the filtrate.

Toluic acids produced in the manner above described were converted to toluic acid esters of low molecular alcohols by conventional esterification procedures. For example, methyl toluate was prepared by refluxing toluic acids with an excess of methanol. Hydrogen chloride and additional methanol were introduced during the refluxing, and excess methanol and produced water were removed overhead. Esters other than the methylester of toluic acid were prepared in similar manner.

The esters of toluic acid with low molecular weight alcohols, especially alcohols containing 1 to 4 carbon atoms per molecule, were readily oxidized to the corresponding monoester of phthalic acid by contacting the toluic acid ester with an oxygen-containing gas at a temperature in the range 300 to 500° F., and preferably in the range 380 to 420° F. This reaction proceeds readily at atmospheric pressure in the absence of catalysts. However, superatmospheric pressure and/or oxidation catalysts may be employed if desired. When superatmospheric pressures are employed the pressure does not ordinarily exceed about 200 p. s. i. g. When it is desired to employ a catalyst in the reaction it is found that conventional oxidation catalysts are operative. Oil-soluble heavy metal salts, for example, salts of manganese, and oil-soluble salts of cobalt are effective catalysts. If a catalyst is to be employed in the process it is preferred to employ a cobalt catalyst such as cobalt 2-ethyl hexanoate, cobalt toluate, or cobalt naphthenate. The concentration of the cobalt catalyst employed is desirably low, being usually in the range 0.001 to 0.05% by weight of cobalt based on the total weight of the reaction mixture.

The following table summarizes data obtained in a series of oxidation runs in which esters of toluic acid with low molecular weight alcohols were oxidized to monoesters of phthalic acid. The runs reported in the table were conducted in glass turbo mixers. The violent agitation and dispersion of oxygen in the turbo mixer provided a superior reaction medium and positive control of the reaction. Oxygen was metered into the base of the turbo mixer at a fixed rate and was dispersed in the reaction mixture. Heat was supplied through either an oil bath or electric heaters. Temperatures were measured by an immersed thermometer. Vapors and tail gases were passed through a water-cooled reflux condenser and water separator where normally liquid components of the tail gas were condensed. The fixed gases were passed through an ice trap before gas samples were taken, and then were vented.

TABLE I

Oxidation of esters of toluic acid

| Run | 1 | 2 | 3 | 4 | 5 | 6 | 7 |
|---|---|---|---|---|---|---|---|
| Isomer | mixed | mixed | mixed | mixed | mixed | mixed | mixed. |
| Time, Hours | 10.5 | 4.75 | 3.25 | 2.83 | 9.08 | 9.05 | 5.25. |
| Temperature, F° | 405 | 405 | 400 | 400 | 400 | 400 | 400. |
| Conc. of Cobalt Catalyst, Wt. per cent (Based on Cobalt Content) | 0.005 | 0.005 | 0.05 | 0.00 | 0.005 | 0.005 | 0.005. |
| Toluate Ester Charged | methyl | methyl | methyl | methyl | methyl | methyl | i-propyl. |
| Toluate Ester, mols charged | 1.22 | 1.23 | 1.21 | 1.21 | 1.27 | 1.16 | 1.06. |
| Toluate Ester, mols recovered | 0.30 | 0.27 | 0.47 | | 0.19 | 0.19 | |
| Toluate Ester, mols consumed | 0.92 | 0.94 | 0.74 | | 1.08 | 0.97 | |
| $O_2$ Charged, mols | 4.70 | 2.53 | 1.67 | | 2.75 | 2.06 | 1.64. |
| $O_2$ Consumed, mols | 1.9 | 1.6 | 0.73 | 0.51 | 1.63 | 1.57 | 0.56. |
| $CO_2$ Produced, mols | 0.46 | 0.4 | 0.37 | | 0.32 | 0.40 | 0.12. |
| $H_2O$ Produced, mols | 1.11 | 1.22 | 0.50 | 0.39 | 2.33 | 1.36 | 0.50. |
| Phthalic Acids Formed, mols | .64 a | 0.66 b | 0.31 a | | 0.54 b | 0.29 c | |
| Yield Mol Percent | 70 | 70 | 42.5 | | 50.6 | 30.0 | | a Recovered as ½ methyl ester.
b Recovered as dimethyl ester.
c Recovered as ½ ethyl ester.

In the runs reported in the above table it was observed that an appreciable induction period of approximately one hour elapsed before rapid consumption of oxygen began, indicating that the oxidation reaction was under way. It has been found possible to eliminate the induction period by adding about 2% by weight of benzaldehyde to the reaction mixture, or by adding about 2% by weight of the crude reaction products produced in the reaction. Neither peroxides nor methyl acid phthalates were effective in reducing the induction period.

Three methods of working up the reaction products have been employed; esterification and distillation of esters, steam distillation of unreacted toluates followed by water extraction of methyl acid phthalates, and saponification followed by isolation of the resultant acids.

In the esterification procedure the crude oxidation products were esterified in the oxidizer with paratoluene sulfonic acid as a catalyst (0.5% by weight) by passing an excess of methanol through the oxidizer at 300° F. over a period of six hours. Esterification was not complete; a few per cent of acid phthalates remained in the products. Esterification was followed by fractionation at 20 millimeters pressure to obtain the methyltoluates (100–115° C.), dimethyl phthalates (162–164° C., M. P. 90° C.), and by-product bottoms (above 200° C. at 10 millimeters). The phthalates were snow-white. The esterification has also been conducted to produce mixed phthalic esters instead of the dimethyl ester by esterifying the methyl acid phthalate with an alcohol other than methanol. When it is desired to produce a mixed phthalic ester in substantially pure form, the monoester of phthalic acid is converted to the acid chloride by conventional methods. For example, this conversion is readily accomplished by heating the monoester with thionyl chloride which produces sulfur dioxide and the acid chloride. The acid chloride is then condensed with an alcohol to produce a mixed phthalic ester. By going through the acid chloride step to produce the mixed ester, alcoholysis is substantially completely eliminated and the di-ester of phthalic acid which is produced consists essentially of a single mixed ester compound.

The mixed esters may be represented by the following formula

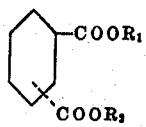

in which $R_1$ is methyl, ethyl, propyl, isopropyl, butyl, or isobutyl and $R_2$ is an alkyl group containing 1 to 20 carbon atoms. Alcohols such as butyl alcohol, stearyl alcohol, 2-ethylhexyl alcohol, and the like, have been esterified with the monoesters of phthalic acids with low molecular weight alcohols to produce mixed esters.

In working up the reaction products by steam distillation and extraction, the total products are first steam stripped to recover unreacted methyl toluates. The non-volatile residue is then exhaustively extracted with hot water from which methyl acid phthalates crystallize upon cooling. The methyl acid phthalates so obtained are snow-white in appearance and are of high purity. Products insoluble in hot water are considered by-products of the reaction, but are known to contain a few per cent phthalic acids.

When it is desired to recover the reaction product in the form of phthalic acid, the total reaction products are saponified with alcoholic sodium hydroxide. Dilute hydrochloric acid is then added to precipitate organic acids. The organic acids are then separated by extracting with hot xylene to recover toluic acids and the xylene insoluble phthalic acids are purified by acetone washing.

Only the esters of toluic acids with low molecular weight alcohols, i. e., alcohols containing 1 to 4 carbon atoms, may be oxidized to produce monoesters of phthalic acids, pursuant to the invention, at appreciably high yields. This is clearly indicated in the above table where the yields of oxidation products obtained by oxidizing the ethyl and isopropyl esters are markedly lower than those obtained by oxidizing the methyl ester.

I claim:

1. A process for producing monoesters of phthalic acids which comprises oxidizing toluic acid esters of low molecular weight alkanols to mono-esters of phthalic acids by contacting them with a free oxygen-containing gas at an elevated temperature and recovering phthalic acid monoesters from a free reaction product.

2. A process for producing monoesters of phthalic acids which comprises catalytically oxidizing toluic acid esters of low molecular weight alkanols to mono-esters of phthalic acids by contacting them with a free oxygen-containing gas at a temperature in the range 300 to 500° F.

3. A process for producing monoesters of phthalic acids and low molecular weight alcohols which comprises oxidizing toluic acid esters of alkanols containing from 1 to 4 carbon atoms per molecule with a free oxygen-containing gas at a temperature in the range 300 to 500° F.

4. A process for producing the monomethyl ester of terephthalic acid which comprises oxidizing methyl meta-toluate by contacting it with a free oxygen-containing gas at a temperature in the range 300 to 500° F.

5. A process for producing the monomethyl ester of isophthalic acid which comprises oxidizing methyl meta-toluate by contacting it with a free oxygen-containing gas at a temperature in the range 300 to 500° F.

6. A process for producing monoesters of orthophthalic acid and low molecular weight alcohols which comprises oxidizing orthotoluic acid esters of alkanols containing 1 to 4 carbon atoms per molecule by contacting them with a free oxygen-containing gas at a temperature in the range 300 to 500° F.

7. A process for producing phthalic acids which comprises catalytically oxidizing toluic acid esters of low molecular weight alkanols by contacting them with a free oxygen-containing gas at a temperature in the range 300 to 500° F. to produce monoesters of phthalic acids with low molecular weight alkanols, hydrolyzing the esters and recovering phthalic acids from the hydrolysis product.

8. A process for producing terephthalic acid which comprises catalytically oxidizing an ester of paratoluic acid and a low molecular weight alkanol by contacting it with a free oxygen-containing gas at a temperature in the range 300 to 500° F. to produce a monoester of terephthalic acid with a low molecular weight alkanol, hydrolyzing the monoester and recovering terephthalic acid from the hydrolysis product.

9. A process for producing isophthalic acid which comprises catalytically oxidizing an ester of metatoluic acid and a low molecular weight alkanol by contacting it with a free oxygen-containing gas at a temperature in the range 300 to 500° F. to produce a monoester of isophthalic acid with a low molecular weight alkanol, hydrolyzing the monoester and recovering isophthalic acid from the hydrolysis product.

10. A process for producing orthophthalic acid which comprises catalytically oxidizing an ester of orthotoluic acid and a low molecular weight alkanol by contacting it with a free oxygen-containing gas at a temperature in the range 300 to 500° F. to produce a monoester of orthophthalic acid with a low molecular weight alkanol, hydrolyzing the monoester and recovering orthophthalic acid from the hydrolysis product.

11. A process for producing mixed di-esters of phthalic acids which comprises oxidizing a toluic acid ester of a low molecular weight alkanol by contacting it with a free oxygen-containing gas at a temperature in the range 300 to 500° F. to produce a monoester of a phthalic acid and a low molecular weight alcohol, esterifying the monoester with an alkanol containing 1 to 20 carbon atoms per molecule other than the low molecular weight alkanol precursor of said toluic acid ester and recovering a mixed diester of a phthalic acid from the esterification product.

12. A process for producing mixed esters of terephthalic acid which comprises oxidizing a paratoluic acid ester of an alkanol containing 1 to 4 carbon atoms per molecule by contacting it with a free oxygen-containing gas at a temperature in the range 300 to 500° F. to form a monoester of terephthalic acid with said alkanol, esterifying the monoester with an alkanol containing 1 to 20 carbon atoms per molecule other than the alkanol precursor of said paratoluic acid ester and recovering a mixed ester of terephthalic acid from the esterification product.

13. A process for producing mixed esters of isophthalic acid which comprises oxidizing a meta-toluic acid ester of an alkanol containing from 1 to 4 carbon atoms per molecule, by contacting it with a free oxygen-containing gas at a temperature in the range 300 to 500° F. to form a monoester of isophthalic acid with said alkanol, esterifying the monoester with an alkanol containing 1 to 20 carbon atoms per molecule other than the alkanol precursor of said paratoluic acid ester and recovering a mixed diester of isophthalic acid from the reaction product.

14. A process for producing mixed esters of acids which comprises oxidizing a toluic acid ester of an alkanol containing from 1 to 4 carbon atoms per molecule by contacting it with a free oxygen-containing gas at a temperature in the range 300 to 500° F. to form a monoester of a phthalic acid with said alkanol, converting the monoester of phthalic acid to a monoester acid chloride and condensing the monoester acid chloride with an alkanol containing 1 to 20 carbon atoms per molecule other than the alkanol precursor of the toluic acid ester.

15. A process for oxidizing methyl meta-toluate and methyl para-toluate to monomethyl esters of the corresponding phthalic acids which comprises contacting the methyl toluate with a free oxygen-containing gas at 380° F. to 500° F. to convert the major proportion of the methyl toluate to the corresponding monomethyl phthalate.

16. A process for producing mono-esters of phthalic acids which comprises oxidizing toluic acid esters of low molecular weight alkanols by contacting them with a free oxygen containing gas at an elevated temperature below about 500° F.

17. The process as defined in claim 16, wherein the toluic acid ester subjected to oxidation is methyl para-toluate.

18. The process as defined in claim 16, wherein the toluic acid ester subjected to oxidation is methyl meta-toluate.

IRVING E. LEVINE.

References Cited in the file of this patent

UNITED STATES PATENTS

| Number | Name | Date |
|---|---|---|
| 1,702,188 | Young | Feb. 12, 1929 |
| 1,815,985 | Pansegrau | July 28, 1931 |
| 1,899,919 | Dvornikoff | Feb. 28, 1933 |
| 1,939,217 | Kyrides | Dec. 12, 1933 |
| 2,339,259 | English et al. | Jan. 18, 1944 |
| 2,479,066 | Gresham | Aug. 16, 1949 |
| 2,479,067 | Gresham | Aug. 16, 1949 |
| 2,531,172 | Toland | Nov. 21, 1950 |
| 2,531,173 | Toland | Nov. 21, 1950 |